United States Patent Office 3,397,161
Patented Aug. 13, 1968

3,397,161
RESINOUS CONDENSATION PRODUCTS OF AMINOPOLYAMIDES AND HALOMETHYLDIPHENYL ETHER
Lewis S. Miller, Bellevue, Wash., assignor to The Dow Chemical Company, Midland, Mich., a corporation of Delaware
No Drawing. Filed June 30, 1965, Ser. No. 468,562
10 Claims. (Cl. 260—18)

ABSTRACT OF THE DISCLOSURE

Thermosetting cationic polymers are obtained by cross-linking an aminopolyamide prepared from a dibasic carboxylic acid and a polyalkylene polyamine with a halomethyldiphenyl ether containing about 1.5–4.0 halomethyl groups per molecule. These cationic polymers are particularly useful as a thermosetting wood adhesive and coating composition.

---

Aminopolyamides are known to react with polyfunctional epoxides to yield useful resinous compositions. For example, Keim describes in U.S. Patent 2,926,154 the preparation of water-soluble cationic resins by the condensation of epichlorohydrin with an aminopolyamide derived from a saturated $C_3$–$C_{10}$ aliphatic dicarboxylic acid and a polyalkylene polyamine. In U.S. Patent 2,999,825 Floyd and Peerman disclose an epoxy-polyamide-ester resin prepared by condensation of an epoxy resin with an aminopolyamide derived from a polymeric fatty acid and excess polyalkylene polyamine. The reactive epoxide is an essential component in these resinous compositions.

It has now been discovered that aminopolyamides having a free amine content of at least 1.0 meq. per gram and soluble in aqueous solutions can be converted into substantially water-insoluble, thermosetting resins by cross-linking with a halomethyldiphenyl ether containing an average of about 1.5–4.0 halomethyl groups per molecule. Particularly useful resins are obtained from aminopolyamides prepared by condensation of a $C_3$–$C_{10}$ dicarboxylic acid with sufficient polyalkylene polyamine to yield a soluble aminopolyamide having a free amine content of at least 1.0 meq./g. and an intrinsic viscosity of at least 0.07 in aqueous solution at 20° C. and thereafter cross-linked with a suitable chloromethyldiphenyl ether.

Reactants

The novel thermosetting polyamide resins described herein are prepared by cross-linking a suitable aminopolyamide with a halomethyldiphenyl ether containing an average of about 1.5 to 4.0 halomethyl group per molecule. Such halomethyldiphenyl ethers are readily prepared by the chloromethylation or bromomethylation of diphenyl ether as described for example by Doedens in U.S. Patent 2,911,380. Particularly suitable are chloromethyldiphenyl ethers such as 2,4'- and 4,4'-bis(chloromethyl)diphenylether, 2,2',4- and 2,4,4'-tris(chloromethyl)diphenylether and 2,2',4,4'-tetrakis(chloromethyl)diphenylether.

As noted by Doedens in U.S. Patent 2,911,380 and by Doedens and Rosenbrock in U.S. Patent 3,047,518 halomethylation of diphenyl ether generally results in a mixture containing an average of up to 4 bromomethyl or chloromethyl groups per molecule. Since diphenyl ether undergoes electrophilic substitution preferentially at positions ortho and para to the ether oxygen, the halomethyl groups are located predominately in the 2-, 2'-, 4-, and 4'-positions. Introduction of more than 4 halomethyl groups is difficult as reaction at the other ortho positions, the 6- and 6'-positions, is sterically hindered once halomethylations has occurred at the 2- and 2'- positions.

The exact composition of a halomethylation product depends upon the reaction conditions and particularly on the proportion of halomethylating agent employed. Several typical compositions obtained by chloromethylation of diphenyl ether are given in Table 1. Note that such mixtures can contain 2- and 4-chloromethyldiphenyl ether as well as the more highly chloromethylated derivatives. Such compositions are often conveniently characterized by the weight percent reactive chlorine, e.g. CMDPE–25, CMDPE–34, etc.

TABLE I.—TYPICAL CHLOROMETHYLDIPHENYL ETHER (CMDPE) COMPOSITIONS

| | Weight Percent Cl | | | | | |
|---|---|---|---|---|---|---|
| | 22.0 | 25.2 | 28.0 | 32.0 | 33.7 | 35.1 |
| Mole Ratio: $ClCH_2$—/DPE | 1.55 | 1.85 | 2.20 | 2.80 | 3.00 | 3.30 |
| Composition (mole percent): | | | | | | |
| Diphenyl Ether (DPE) | 13.8 | 0 | 0 | 0 | 0 | 0 |
| 2-chloromethyl DPE | 3.3 | 0.3 | 0 | 0 | 0 | 0 |
| 4-chloromethyl DPE | 24.9 | 2.4 | 1.5 | 0 | 0 | 0 |
| 2,4'-bis(chloromethyl)DPE | 15.2 | 17.7 | 1.9 | 0.1 | 0 | |
| 4,4'-bis(chloromethyl)DPE | 35.5 | 68.5 | 50.2 | 8.6 | 9.3 | 1 |
| Tris(chloromethyl)DPE [a] | 5.1 | 10.5 | 26.7 | 89 | 68.4 | 55.5 |
| Tetrakis(chloromethyl)DPE [b] | 1.0 | <1.0 | 1.6 | 2 | 21.9 | 43.0 |

[a] Predominately 2,4,4'-tris(chloromethyl) DPE, M.P. 57-8° C. with small amount of 2,2',-4tris(chloromethyl) DPE.
[b] 2,2',4,4'-tetrakis(chloromethyl) DPE, M.P. 78-81° C.

The individual components of the halomethylation mixtures can be separated and purified by distillation, fractional crystallization and other conventional means. The resulting pure bis-, tris- and tetrakis(halomethyl)diphenyl ether can be used individually as cross-linking agents for the aminopolyamides. However, it is often advantageous to use as the cross-linking agent a halomethylation mixture having an average of 1.5 to 4.0 halomethyl groups per diphenyl ether molecule. Particularly satisfactory results are obtained using a chloromethyldiphenyl ether containing an average of about 1.5 to 3.3 chloromethyl groups per diphenyl ether moiety.

The second essential reactant is a soluble aminopolyamide having a free amine content of at least 1.0 meq./g. and an intrinsic viscosity in aqueous solution of at least 0.07 at 20° C. Particularly suitable aminopolyamides are prepared by the conventional hot melt polymerization of a dicarboxylic acid, such as succinic acid, adipic acid, azelaic acid, terephthalic acid, isophthalic acid, and other $C_3$–$C_{10}$ dicarboxylic acids, with sufficient polyalkylene polyamine to yield a aminopolyamide soluble in water, aqueous alcohol or similar aqueous solvents. Also suitable are aminopolyamides prepared from polymeric fatty acids such as described by Floyd and Peerman in U.S. Patent 2,998,825 and by Benoit in U.S. Patent 3,169,980. To increase the water resistance of the final thermoset product, use of a soluble, aminopolyamide prepared from a $C_8$–$C_{10}$ aromatic dicarboxylic acid or a polymeric fatty acid is often advantageous.

In preparing the intermediate aminopolyamides, it is desirable to use a polyalkylene polyamine such as diethylenetriamine, dipropylenetriamine, 2-aminoethylpiperazine, triethylenetetramine, tetraethylenepentamine and dihexamethylenetriamine which contains both primary and secondary amino groups. Particularly suitable are polyalkylene polyamines of the formula:

$$NH_2(C_aH_{2a}NH)_nH$$

wherein $a$ is 2–6 and $n$ is 2–5. Occasionally it is desirable to include in the amidation mixture a diamine such as ethylenediamine, propylenediamine, or 1,6-hexamethylenediamine.

To react the primary amino groups preferentially with the acid moieties and leave the secondary amino groups as sites for further polymerization and cross-linking, about 1 mole of polyalkylene polyamine is usually charged per mole of dicarboxylic acid. Then the mixture is heated at 100°–250° C. or more, preferably at 150°–210° C., for a time sufficient to achieve the desired degree of polymerization. This generally requires 0.5–3 hours or more.

To obtain optimum properties in the final cross-linked resin, it is essential that the aminopolyamide contain at least 1.0 and preferably from 1.0–7.0 meq. free amine per gram (meq./g). Furthermore the aminopolyamide should have a minimum degree of polymerization such that the intrinsic viscosity of the polymer in solution at 20° C. is at least 0.07 and preferably 0.07–0.5.

The intrinsic viscosity of the aminopolyamide is determined in a conventional manner by extrapolating to infinite dilution the reduced specific viscosity of several dilute solutions containing from about 0.1–1.0 weight percent aminopolyamide. Water, aqueous pyridine or alcohol, methanol and isopropanol are suitable solvents, although addition of sufficient sodium chloride to minimize electrostatic interaction of the polyamide molecules is usually desirable. After determining the viscosity of several dilute aminopolyamide solutions with a standard Ostwald-Cannon-Fenske capillary viscometer, the reduced specific viscosities are calculated from the formula:

$$N_r = \frac{N' - N}{NC}$$

wherein $N_r$ is the reduced viscosity,
$N'$ is the viscosity of the aminopolyamide solution,
$N$ is the viscosity of the solvent, and
$C$ is the aminopolyamide concentration.

In commercial practice, careful time-temperature relations are often used to control the degree of aminopolyamide polymerization.

Cross-linked thermosetting resins

The aminopolyamides described above react rapidly when mixed with a chloromethyl- or bromomethyldiphenyl ether at room temperature to form cross-linked thermosetting resins. Depending upon the specific reactants and reactant ratios, the resinous products have a useful pot life ranging from a few seconds to several days at ambient temperature. Often diluents such as methanol, ethanol, methylene chloride, ethylene dichloride, toluene m-cresol, dimethylformamide and other similar organic solvents are used to moderate the reaction and provide a solution of the cross-linked resin for convenient application as an adhesive or coating. Preferably such solutions contain from 10 to 50 weight percent or more solids.

A critical factor in determining the properties of the cross-linked resin is the ratio of the halomethyl groups of the halomethyldiphenyl ether and the free amino groups of the aminopolyamide. Cross-linking occurs with even small amounts of polyhalomethyldiphenyl ether. But to obtain useful thermosetting resins crosslinked with a polychloromethyldiphenyl ether, a minimum chloromethyl to free amine mole ratio of 0.20 is required. To obtain more rapid and extensive cross-linking, a mole ratio up to 1.2–1.5 or more halomethyl groups per free amine groups can be used. A mole ratio greater than 3.5 is generally not advantageous.

After mixing the desired amounts of halomethyldiphenyl ether and aminopolyamide, polymerization and cross-linking normally occur spontaneously at room temperature. However, if necessary the reaction rate can be increased by heating the reactants. As an adhesive or coating composition, the resinous thermosetting mixture is preferably applied in liquid form to the wood or metal surface and then cured at ambient or elevated temperature. The pH of the mixture can be adjusted as required for specific application. Also many conventional adhesive additives can be easily incorporated prior to final curing.

The cured aminopolyamide-halomethyldiphenyl ether resin is a substantially water-insoluble, cationic, rubbery to brittle solid varying in color from light to deep amber. When formulated as an adhesive, the composition has a high tack pickup and a rapid cure at room temperature. It bonds extremely tightly to wood, paper and metal foil. When cured the resin darkens only slightly under prolonged exposure to ultraviolet light and is not affected by contact with strong alkali.

To illustrate further the present invention and its advantages, the following examples are given without limiting the invention thereto. Within its general scope, more exact formulations and optimum reaction conditions for a given system can be determined by those skilled in the art in a routine manner. Unless otherwise specified, all parts and percentages are by weight.

Example 1.—Aminopolyamides (A) To a resin kettle charged with 33.0 parts (0.32 mole) diethylenetriamine was added 53.2 parts (0.32 mole) isophthalic acid. Air was purged from the reactor with nitrogen and the mixture heated with stirring to about 180° C. Then over a period of 2.2 hrs. the temperature was gradually increased to about 210°–215° C. During this period 11.1 parts (0.62 mole) of water was distilled from the amidation mixture.

The hot melt was discharged on to dry pans and cooled. Then the hard, brittle, amber-colored resin was broken up and ground into a fine powder. A 40% aqueous solution of the aminopolyamide had a pH of about 9.4. Titration indicated 4.46 meq. free amine/g. The intrinsic viscosity as determined in dilute aqueous methanol containing added sodium chloride was 0.11 at 20° C.

(B) Other aminopolyamides having the desired free amine content and intrinsic viscosity can be prepared by a similar hot melt polymerization. A number of typical aminopolyamides useful as intermediates in the present invention are shown in Table 2.

TABLE 2.—AMINOPOLYAMIDES

| Resin No. | Acid | Amine | Mole Ratio, Acid/Amine | Aminopolyamide | |
|---|---|---|---|---|---|
| | | | | Intrinsic Visc. | Free Amine, (meq./g.) |
| 2–1 | Isophthalic | Diethylenetriamine | 1/1 | 0.11 | 4.46 |
| 2–2 | Terephthalic | do | 1/1 | 0.22 | 4.30 |
| 2–3 | Isophthalic | Ethylenediamine and Diethylenetriamine | 4/(3+1) | 0.085 | 1.52 |
| 2–4 | do | Dihexamethylenetriamine and hexamethylenediamine | 2/(1+1) | 0.36 | 1.29 |
| 2–5 | do | Triethylenetetramine | 1/1 | 0.094 | 7.02 |
| 2–6 | Adipic | Diethylenetriamine | 1/1 | 0.166 | 4.88 |
| 2–7 | Isophthalic | do | 1/1.2 | 0.08 | 5.86 |
| 2–8 | do | Aminoethylpiperazine | 1/1 | 0.25 | 3.73 |
| 2–9 | Adipic | do | 1/1 | 0.46 | 4.05 |

Example 2.—Aminopolyisophthalamide-CMDPE resins (A) 100 parts of the finely ground aminopolyisophthalamide resin described in Example 1A (Resin 2–1, Table 2) was dissolved in 100 parts of methanol. To 8.0 parts (17.8 meq. free amine basis) of the methanolic aminopolyamide solution was added at room temperature 2.0 parts (14.2 meq. Cl basis) of a chloromethyldiphenyl ether containing 25.2 weight percent Cl (1.85 ClCH$_2$—/DPE). Stirring gave a clear solution which after 80–90 minutes at ambient temperature set to an amber colored, rubbery solid.

(B) In a similar manner other mixtures containing from 1 to 8 parts of aminopolyamide Resin 2-1 per part of CMDPE-25, i.e. a mole ratio of $ClCH_2$—/free amine of 0.2–1.6, were prepared in methanol. At ambient temperature, these mixtures had a working life of up to 30 minutes. However, compositions containing 8 or more parts of Resin 2-1 per part CMDPE-25 failed to set to a useful degree in several hours at room temperature.

(C) Other thermosetting resins were prepared by reacting 2 and 6 parts of Resin 2-1 with 1 part of CMDPE-32 in methanol at room temperature.

(D) To 45.2 parts (100 meq. free amine basis) of Resin 2-1 dissolved in 45.2 parts of dimethylformamide was added 13.4 parts (50 meq. Cl basis) of CMDPE-25. The mixture had a useful pot life of about an hour at room temperature.

(E) To 2.0 parts (4.4 meq. free amine basis) of Resin 2-1 dissolved in 18 parts of m-cresol was added 1.0 parts (3.7 meq. Cl basis) of 4,4′-bis(chloromethyl) diphenyl ether. Evaporation of the solvent at 100° C. gave a clear self-supporting resinous film.

Example 3.—Adhesive tests (A) To test the aminoisophthalamide-CMDPE resins described in Example 2 as a plywood adhesive, three 3¾″ x 6¹³⁄₃₂″ pieces of ³⁄₁₆″ Douglas fir veneer having the grain in the narrow direction were laid up as a 3-ply laminate. To provide the most difficult gluing combination, the laminate was laid up with the tight sides in thus forming a tight-to-tight and a loose-to-tight glue line combination. About 2.5 g. of the test adhesive mixture was weighed onto the tight side of the outer laminates and spread with a spatula. After a 5–10 minute assembly time, the test pieces were clamped together and cured for 24 hours, at room temperature. After unclamping five 1″ x 3.25″ kerfed specimens were cut from each laminate. Two specimens were dry sheared while the remaining three were sheared after soaking in water 4 hours. The breaking strength, the percent wood failure, and the ratio of wet shear to dry shear strength were determined.

With the aminoisophthalamide-CMDPE resin described in Example 2A, the laminate had an average dry shear strength of 465 p.s.i. with 100 percent wood failure. Specimens soaked for 4 hours in water had an average wet shear strength of 330 p.s.i. with about 45 percent wood failure. Wood failure in the soaked specimens was variable and difficult to determine. Typical results with other aminoisophthalamide-CMDPE resins are given in Table 3.

(B) In another test hot press gluing was done with a mixture of 4 parts of Resin 2-1 and 1 part of CMDPE-25. Three-ply laminates were prepared as described in Example 3A and pressed at 200 p.s.i. and 140° C. for 2–5.75 minutes. The resulting laminates had a dry shear strength of 255–295 p.s.i. with 100% wood failure. The wet shear strength after soaking for 48 hours was 45–67% of the dry shear.

(C) To examine the resin ultility as a wood to metal adhesive, a thin piece of solvent cleaned, dichromate treated aluminum was glued to a Douglas fir veneer with mixture of 4 parts of Resin 2-1 and 1 part of CDMPE-25. The shear strength of the dry specimen was about 440 p.s.i.

Example 4.—Wood coating

To 14.2 parts (31.6 meq. free amine basis) of a 50 percent solution of Resin 2-1 in methanol was added 3.6 parts (25.6 meq. Cl basis) of CMDPE-25 and the liquid solution spread as a heavy coating on Douglas fir lumber. The coating set hard in a few minutes at room teemperature. The wood bond strength of the coating was tested by making a V-shaped cut through the coating and then lifting the film. There was 100 percent wood failure. Exposure of the coating to intense ultraviolet radiation for 2–8 hours resulted in only slight darkening of the polymer film. Surface contact of the coated wood with 25 percent sodium hydroxide while exposed to the UV radiation showed no visible effect.

Example 5.—Other aminopolyamide-CMDPE resins

Other aminopolyamides such as described in Example 1 are converted into useful wood adhesives and coatings by reaction with CMDPE-25, CMDPE-34 and other chloromethyldiphenyl ethers containing from about 1.5 to 4.0 $ClCH_2$—/DPE. Generally better results are obtained using methanol, ethanol, dimethylformamide or toluene as a diluent rather than an aqueous emulsion system.

(A) Typical test data from several other aminopolyamide-CMDPE resins used as an adhesive for Douglas fir laminates as described in Example 3 are given in Table 4.

TABLE 4.—DOUGLAS FIR VENEER LAMINATES

| Adhesive | | Diluent | Wet Shear Strength/ |
| Resin | Pts. Resin/Pts. CMDPE-25 | | Dry Shear Strength [a] |
| --- | --- | --- | --- |
| | | | Percent |
| 2-5 | 1.0 | Methanol | 93 |
| 2-6 | 2.0 | ---do------ | 29 |
| 2-7 | 1.0 | ---do------ | 88 |
| 2-9 | 4.0 | ---do------ | 24 |

[a] The dry shear strength ranged from 275–465 p.s.i. with 90–100% wood failure.

(B) To 20 parts (117.2 meq. free amine) of Resin 2-7 dissolved in an equal weight of methanol was added 10 parts (71.2 meq., Cl basis) of CMDPE-25. The liquid mixture was flow coated onto 4 x 4″ Douglas fir siding. The coating dried to a hard film in less than 2 hours. Under an infrared lamp, drying was complete in a few minutes. The film was resistant to 25% sodium hydroxide and darkened only slightly on prolonged exposure to ultraviolet radiation. The dry film could not be removed without wood damage.

(C) A solution of 5 parts (5.1 meq. free amine) of Resin 2-5 and 1 part (7.5 meq., Cl basis) of 4,4′-bis (chloromethyl)diphenyl ether was poured into a glass Petri dish and dried for 1 hour at 100° C. giving a clear somewhat flexible film. The film softened and became swollen when soaked in water but remained coherent. The

TABLE 3.—DOUGLAS FIR VENEER LAMINATES

| Test | Resin | CMDPE | Parts Resin/ Part CMDPE | $ClCH_2$—[a]/ Free Amine | Wet/Dry Shear Strength [b] | |
| --- | --- | --- | --- | --- | --- | --- |
| | | | | | 4 hrs. Percent | 24 hrs. Percent |
| 3-1 | 2-1 | CMDPE-2 | 1.0 | 1.6 | 54 | 48 |
| 3-2 | 2-1 | CMDPE-2 | 2.0 | 0.8 | 70 | 77 |
| 3-3 | 2-1 | CMDPE-2 | 4.0 | 0.4 | 98 | 83 |
| 3-4 | 2-1 | CMDPE-2 | [c] 6.0 | 0.27 | 38 | |
| 3-5 | 2-1 | CMDPE-3 | 2.0 | 1.01 | 53 | |
| 3-6 | 2-1 | CMDPE-3 | 6.0 | 0.34 | 44 | |

[a] Calcd. mole ratio.
[b] The dry shear strength ranged from 275–465 p.s.i. with 90–100% wood failure; the wet shear strength was determined after 4 or 24 hour immersion in water.
[c] Dimethylformamide solvent.

degree of swelling can be controlled to a degree by the chloromethyl content and amount of CMDPE used.

Example 6.—Aminopoly fatty acid amide-CMDPE resins (A) To 2 parts of Versamid 100, a commercial aminopolyfatty acid amide from General Mills, Inc. and preprepared by the process of U.S. Patent 2,379,413 which contained 1.56 meq. free amine/g. in ethanol was added 1 part of CMDPE–25. On drying the mixture a good pressure sensitive adhesive was formed. Coated on a polyvinyl fluoride film the adhesive gave a tape having a peel strength of about 3.6 p.s.i. when bonded to hardboard. For comparison a standard commercial tape had a peel strength of 3.6 p.s.i.

I claim:
1. A cationic, thermosetting resin which comprises the reaction product of:
   (A) A halomethyldiphenyl ether containing an average of about 1.5–4.0 bromomethyl or chloromethyl groups per molecule, and
   (B) A water soluble aminopolyamide characterized by a free amine content of at least 1.0 meq./g. and an intrinsic viscosity of at least 0.07 in an aqueous solution at 20° C.,
wherein the mole ratio of halomethyl to free amine groups in the halomethyldiphenyl ether and aminopolyamide reactants is about 0.2 to 3.5.

2. The cationic resin of claim 1 wherein the halomethyl reactant is a chloromethyldiphenyl ether.

3. The cationic resin of claim 1 wherein the halomethyl reactant is a chloromethyldiphenyl ether containing an average of 1.5–3.3 chloromethyl groups per molecule.

4. The cationic resin of claim 1 wherein the halomethyl reactant is 4,4′-bis(chloromethyl)diphenyl ether.

5. The cationic resin of claim 2 wherein the aminopolyamide contains from 1.0–7.0 meq. free amine/g.

6. The cationic resin of claim 2 wherein the aminopolyamide is an aminopolyfatty acid amide.

7. The cationic resin of claim 2 wherein the aminopolyamide is prepared from a $C_3$–$C_{10}$ dicarboxylic acid.

8. The cationic resin of claim 2 wherein the aminopolyamide is prepared from isophthalic acid.

9. A process for preparing a cationic, thermosetting resin which comprises reacting:
   (A) A halomethyldiphenyl ether containing an average of about 1.5–4.0 bromomethyl or chloromethyl groups per molecule, and
   (B) a water soluble aminopolyamide characterized by a free amine content of at least 1.0 meq/g. and an intrinsic viscosity of at least 0.07 in an aqueous solution at 20° C.,
the mole ratio of halomethyl to free amine groups in the halomethyldiphenyl ether and aminopolyamide reactants being about 0.2 to 3.5.

10. In a process for preparing a cationic, thermosetting resin by crosslinking a water soluble aminopolyamide, the improvement which consists essentially in reacting a water soluble aminopolyamide characterized by a free amine content of 1.0–7.0 meq./g. and an intrinsic viscosity of 0.07–0.5 in aqueous solution at 20° C., with a chloromethyldiphenyl ether containing an average of 1.5–3.3 chloromethyl groups per molecule, the mole ratio of chloromethyl to free amine groups in the chloromethyldiphenyl ether and aminopolyamide reactants being about 0.2 to 3.5.

References Cited
UNITED STATES PATENTS 3,215,654  11/1965  Schmalz _____ 260—17.3
3,329,657  7/1967  Strazdins et al. _____ 260—78

WILLIAM H. SHORT, *Primary Examiner.*

L. L. LEE, *Assistant Examiner.*